United States Patent
Sakai et al.

(10) Patent No.: US 12,359,064 B2
(45) Date of Patent: Jul. 15, 2025

(54) POLYIMIDE RESIN COMPOSITION AND MOLDED BODY

(71) Applicant: MITSUBISHI GAS CHEMICAL COMPANY, INC., Chiyoda-ku (JP)

(72) Inventors: Atsushi Sakai, Kanagawa (JP); Yuuki Sato, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 725 days.

(21) Appl. No.: 17/632,671

(22) PCT Filed: Jun. 22, 2020

(86) PCT No.: PCT/JP2020/024311
§ 371 (c)(1),
(2) Date: Feb. 3, 2022

(87) PCT Pub. No.: WO2021/024625
PCT Pub. Date: Feb. 11, 2021

(65) Prior Publication Data
US 2022/0289975 A1    Sep. 15, 2022

(30) Foreign Application Priority Data
Aug. 8, 2019 (JP) .................................. 2019-146611

(51) Int. Cl.
C08L 79/08 (2006.01)
(52) U.S. Cl.
CPC ..................................... C08L 79/08 (2013.01)
(58) Field of Classification Search
CPC ........... C08L 79/08; C08L 27/12; C08K 3/04; C08K 7/06
See application file for complete search history.

(56) References Cited

U.S. PATENT DOCUMENTS

| 2016/0177062 A1 | 6/2016 | Sato et al. |
| 2017/0252986 A1 | 9/2017 | Watanabe et al. |

FOREIGN PATENT DOCUMENTS

| JP | 8-311338 A | 11/1996 |
| JP | 2016-204570 A | 12/2016 |
| JP | 2018-80292 A | 5/2018 |
| WO | WO 2015/020020 A1 | 2/2015 |

OTHER PUBLICATIONS https://www.calsak.com/wp-content/uploads/2013/10/KT-300M-specifications.pdf Kitamura LTD PTFE Powder KT-600M (Year: 2013).*
https://www.calsak.com/wp-content/uploads/2013/10/KT-600M-specifications.pdf Kitamura LTD PTFE Powder KT-300M (Year: 2013).*
Extended European Search Report issued on Aug. 5, 2022 in European Patent Application No. 20849246.2, 8 pages.
Office Action issued Dec. 1, 2020 in corresponding Japanese Patent Application No. 2020-556339 (with English Translation), 6 pages.
Catalog PTFE-KTKTL, 400° C. High Heat-resistant PTFE Lubricating Additives KT / KsTL Series, [online], Kamumura Co., Ltd., Jun. 2020, p. 1 3, 7, [Search date : Nov. 26, 2020], 7 pages Internet <URL:http://www.kitamuraltd.jp/download/Catalog PTFE - KTKTL.pdf>.
International Search Report mailed on Sep. 8, 2020 in PCT/JP2020/024311 filed on Jun. 22, 2020 (2 pages).

* cited by examiner

Primary Examiner — Catherine S Branch
Assistant Examiner — Olga Lucia Donahue
(74) Attorney, Agent, or Firm — Oblon, McClelland, Maier & Neustadt, L.L.P.

(57) ABSTRACT

A polyimide resin composition containing a polyimide resin (A) and a fluororesin (B), wherein the polyimide resin (A) contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is 20 to 70 mol %, and the fluororesin (B) has a weight loss percentage measured using a differential scanning calorimeter after heating from 100° C. to 450° C. at a heating rate of 10° C./min in an air atmosphere of 1% or less:

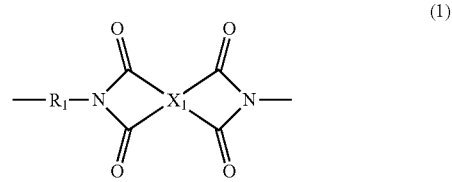

(1)

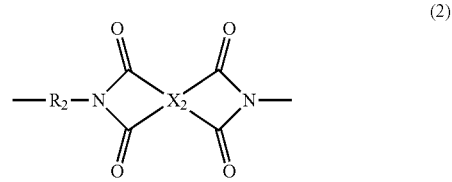

(2)

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring; and a molded article thereof.

9 Claims, No Drawings

POLYIMIDE RESIN COMPOSITION AND MOLDED BODY

CROSS-REFERENCE TO RELATED APPLICATIONS

The present application is a 35 U.S.C. § 371 national stage application of International patent application PCT/JP2020/024311, filed Jun. 22, 2020, which is based on and claims the benefit of priority to Japanese Application No. 2019-146611, filed Aug. 8, 2019. The entire contents of these applications are incorporated herein by reference.

TECHNICAL FIELD

The present invention relates to a polyimide resin composition and a molded article.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding process ability.

Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable. In addition, although polyimide resins generally exhibit good slidability, it is possible to aim for even higher slidability by adding a slidability-improving agent.

Slidable materials obtained by adding a slidability-improving agent to a high heat-resistant resin are processed into gears, shaft bearings, bearings, bushes, and the like, and are widely used particularly in fields where high heat resistance is required such as conveyance equipment, and the usefulness of such materials is high.

For example, Patent Literature 1 discloses a polyimide resin composition containing a thermoplastic polyimide resin having a predetermined repeating structural unit and an additive such as a slidability-improving agent.

CITATION LIST

Patent Literature

PTL 1: WO 2015/020020

SUMMARY OF INVENTION

Technical Problem

However, there is room for further improvement in the slidability of a molded article formed from a polyimide resin composition. Further, the present inventors have found that a molded article of a polyimide resin composition in which a slidability-improving agent has been blended with a polyimide resin may cause appearance defects such as surface roughness and surface layer peeling.

An object of the present invention is to provide a polyimide resin composition that has good molding processability and can produce a molded article having high slidability and good appearance.

Solution to Problem

The present inventors have found that the aforementioned object can be attained by a polyimide resin composition containing a particular polyimide resin and a fluororesin satisfying a particular requirement.

That is, the present invention relates to: a polyimide resin composition containing a polyimide resin (A) and a fluororesin (B), wherein the polyimide resin (A) contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is 20 to 70 mol %, and the fluororesin (B) has a weight loss percentage measured using a differential scanning calorimeter after heating from 100° C. to 450° C. at a heating rate of 10° C./min in an air atmosphere of 1% or less; and a molded article comprising the same.

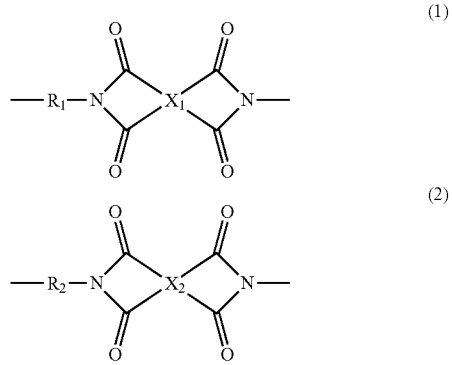

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

Advantageous Effects of Invention

According to the present invention, a polyimide resin composition that has good molding processability and can produce a molded article having high slidability and good appearance can be provided. The molded article of the present invention has excellent slidability, and in particular is suitably used for various shaft bearings such as shaft bearings for automobiles and shaft bearings for copiers, gears, bearings, bushes, mechanical seals, transmission seals, and the like.

DESCRIPTION OF EMBODIMENTS

[Polyimide Resin Composition]

The polyimide resin composition of the present invention contains a polyimide resin (A) and a fluororesin (B), wherein the polyimide resin (A) contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is 20 to 70 mol %, and the fluororesin (B) has a weight loss percentage measured using a differential scanning calorimeter after heating from 100° C. to 450° C. at a heating rate of 10° C./min in an air atmosphere of 1% or less.

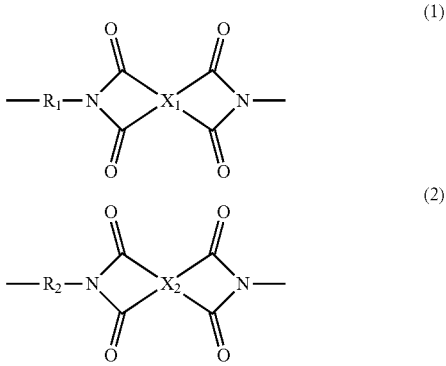

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_9$ each independently represent a tetravalent group having from 6 to 22 carbon atoms containing at least one aromatic ring.

The polyimide resin composition of the present invention is a resin composition that exhibits thermoplasticity and is excellent in molding processability due to containing the polyimide resin (A) in which particular different polyimide structural units are combined at the particular ratio described above. Further, by combining the polyimide resin (A) with a particular fluororesin (B), a resin composition that can produce a molded article having high slidability and good appearance is obtained.

<Polyimide Resin (A)>

The polyimide resin (A) used in the present invention contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %;

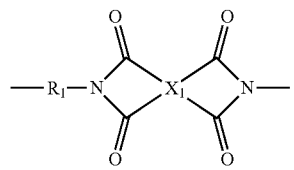

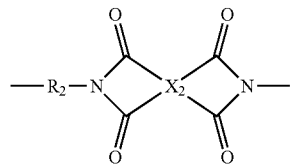

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The polyimide resin (A) used in the present invention is a thermoplastic resin, which is preferably in a powder or pellet form. The thermoplastic polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

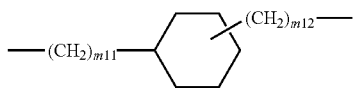

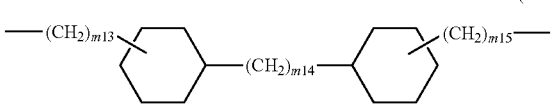

wherein $m_{11}$ and $m_{12}$ each independently represent an integer of 0-2, and preferably 0 or 1; and $m_{12}$ to $m_{15}$ each independently represent an integer of 0-2, and preferably 0 or 1.

$R_1$ is particularly preferably a divalent group represented by the following formula (R1-3):

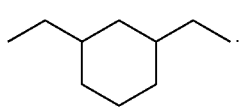

(R1-3)

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

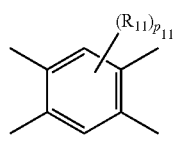

(X-1)

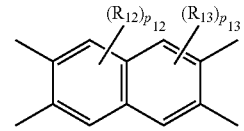

(X-2)

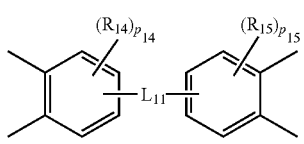

(X-3)

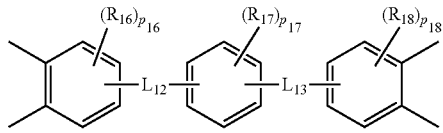

(X-4)

wherein $R_{11}$ to $R_{18}$ each independently represent an alkyl group having from 1 to 4 carbon atoms; $p_{11}$ to $p_{13}$ each independently represent an integer of 0-2, and preferably 0; pH, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$ and $p_{13}$ in the formula (X-2) are selected in such a manner that the tetravalent group represented by the formula (X-2) has from 10 to 22 carbon atoms.

Similarly, Lu, $R_{14}$, $R_{15}$, $p_{14}$ and $p_{15}$ in the formula (X-3) are selected in such a manner that the tetravalent group represented by the formula (X-3) has from 12 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 18 to 22 carbon atoms.

$X_1$ is particularly preferably a tetravalent group represented by the following formula (X-5) or (X-6):

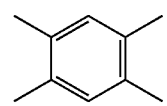

(X-5)

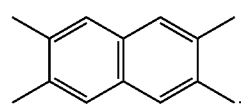

(X-6)

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of $R_2$ is a divalent chain aliphatic group having from 5 to 16 carbon atoms containing an ether group. The divalent chain aliphatic group preferably has from 6 to 14 carbon atoms, more preferably from 7 to 12 carbon atoms, and further preferably from 8 to 10 carbon atoms. Preferred examples of the group include a divalent group represented by the following formula (R2-1) or (R2-2):

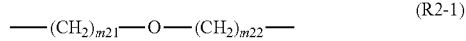

(R2-1)

(R2-2)

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

$R_2$ represents a divalent chain aliphatic group having from 5 to 16 carbon atoms (preferably from 6 to 14 carbon atoms, more preferably from 7 to 12 carbon atoms, and further preferably from 8 to 10 carbon atoms), and therefore $m_{21}$ and $m_{22}$ in the formula (R2-1) are selected so that the divalent group represented by the formula (R2-1) has from 5 to 16 carbon atoms (preferably from 6 to 14 carbon atoms, more preferably from 7 to 12 carbon atoms, and further preferably from 8 to 10 carbon atoms), i.e., $m_{21}+m_{22}$ is from 5 to 16 (preferably 6 to 14, more preferably 7 to 12, and further preferably 8 to 10).

Similarly, $m_{23}$ to $m_{25}$ in the formula (R2-2) are selected so that the divalent group represented by the formula (R2-2) has from 5 to 16 carbon atoms (preferably from 6 to 14 carbon atoms, more preferably from 7 to 12 carbon atoms, and further preferably from 8 to 10 carbon atoms), i.e., $m_{23}+m_{24}+m_{25}$ is from 5 to 16 (preferably from 6 to 14 carbon atoms, more preferably from 7 to 12 carbon atoms, and further preferably from 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is 20 mol % to 70 mol %. In the case where the content ratio of the repeating structural unit of the formula (1) is in the above range, the polyimide resin may also be sufficiently crystallized in an ordinary injection molding cycle. When the content ratio is less than 20 mol %, molding processability is deteriorated, and when the content ratio is more than 70 mol %, crystallinity is deteriorated to thereby result in deterioration in heat resistance.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less from the viewpoint of exerting high crystallinity.

Among these, the content ratio of the repeating structural unit of the formula (1) with respect to the total of the repeating structural unit of the formula (1) and the repeating structural unit of the formula (2) is preferably 20 mol % or more and less than 40 mol %. When the ratio falls within this range, the crystallinity of the polyimide resin (A) increases, and it is possible to obtain a resin composition being more excellent in heat resistance.

The content ratio described above is preferably 25 mol % or more, more preferably 30 mol % or more, further preferably 32 mol % or more from the viewpoint of molding processability, and is further preferably 35 mol % or less from the viewpoint of exerting high crystallinity.

The content ratio of the total of the repeating structural unit of the formula (1) and the repeating structural unit of the formula (2) with respect to the total repeating structural units constituting the polyimide resin (A) is preferably 50 to 100 mol %, more preferably 75 to 100 mol %, further preferably 80 to 100 mol %, and still further preferably 85 to 100 mol %.

The polyimide resin (A) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

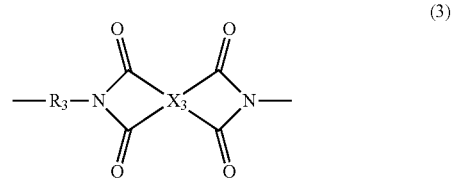

(3)

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., —C($CF_3$)$_2$— and —($CF_2$)$_p$— (wherein p is an integer of 1-10), as well as —CO—, —$SO_2$—, —SO—, —CONH—, and —COO—.

$R_3$ is preferably a divalent group represented by the following formula (R3-1) or (R3-2);

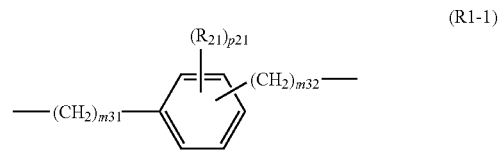

(R1-1)

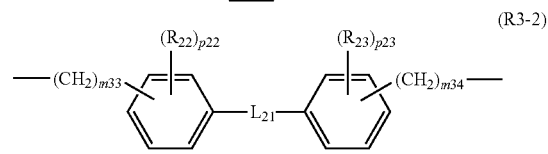

(R3-2)

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

The polyimide resin (A) may further contain a repeating structural unit represented by the following formula (4):

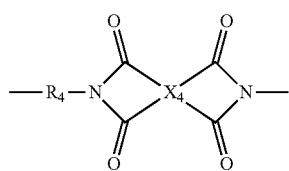

(4)

wherein $R_4$ represents a divalent group containing —$SO_2$— or —$Si(R_x)(R_y)O$—; $R_x$ and $R_y$ each independently represent a chain aliphatic group having from 1 to 3 carbon atoms, or a phenyl group; and $X_4$ represents a tetravalent group having from 6 to 22 carbon atoms containing at least one aromatic ring.

$X_4$ is defined similarly to $X_1$ in the formula (1), and preferred embodiments thereof are also the same.

The end structure of the polyimide resin (A) is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin (A) contains the above particular group at the end thereof, it is possible to obtain a resin composition excellent in heat aging resistance.

Example of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms from the viewpoint of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin (A) preferably contains only a chain aliphatic group having from 5 to 14 carbon atoms, besides a terminal amino group and a terminal carboxy group, at the end thereof from the viewpoint of heat aging resistance. When a group, besides the above groups, is contained at the end, the content thereof with respect to the chain aliphatic group having from 5 to 14 carbon atoms is preferably 10 mol % or less and more preferably 5 mol % or less.

The content of the chain aliphatic group having from 5 to 14 carbon atoms in the polyimide resin (A) is preferably 0.01 mol % or more, more preferably 0.1 mol % or more, and further preferably 0.2 mol % or more based on the total 100 mol % of the total repeating structural units constituting the polyimide resin (A) from the viewpoint of exerting excellent heat aging resistance. In order that a sufficient molecular weight is ensured and good mechanical properties are achieved, the content of the chain aliphatic group having from 5 to 14 carbon atoms in the polyimide resin (A) is preferably 10 mol % or less, more preferably 6 mol % or less and further preferably 3.5 mol % or less based on the total 100 mol % of the total repeating structural units constituting the polyimide resin (A).

The content of the chain aliphatic group having from 5 to 14 carbon atoms in the polyimide resin (A) can be determined by depolymerization of the polyimide resin (A).

The polyimide resin (A) preferably has a melting point of 360° C. or less and a glass transition temperature of 150° C. or more. The melting point of the polyimide resin (A) is more preferably 280° C. or more and further preferably 290° C. or more from the viewpoint of heat resistance, and is preferably 345° C. or less, more preferably 340° C. or less, and further preferably 335° C. or less from the viewpoint of exerting high molding processability. In addition, the glass transition temperature of the polyimide resin (A) is more preferably 160° C. or more and more preferably 170° C. or more from the viewpoint of heat resistance, and is preferably 250° C. or less, more preferably 230° C. or less, and further preferably 200° C. or less from the viewpoint of exerting high molding processability.

Both the melting point and the glass transition temperature of the polyimide resin can be measured by a differential scanning calorimeter.

In addition, in the polyimide resin (A), the exothermic amount (hereinafter, also simply referred to as "exothermic amount of crystallization") of the crystallization exothermic peak observed in melting and then cooling of the polyimide resin at a cooling rate of 20° C./min with differential scanning calorimetric measurement is preferably 5.0 mJ/mg or more, more preferably 10.0 mJ/mg or more, and further preferably 17.0 mJ/mg or more from the viewpoint of enhancement of crystallinity, heat resistance, mechanical strength, and chemical resistance. The upper limit of the exothermic amount of crystallization is not particularly limited, and is usually 45.0 mJ/mg or less.

Specifically, the melting point, the glass transition temperature, and the exothermic amount of crystallization of the polyimide resin can be measured by the methods described in Examples.

The logarithmic viscosity of the polyimide resin (A) at 30° C. in a 5 mass % concentrated sulfuric acid solution is preferably 0.2 to 2.0 dL/g and more preferably 0.3 to 1.8 dL/g. When the logarithmic viscosity is 0.2 dL/g or more, a molded article formed of the polyimide resin composition obtained has sufficient mechanical strength, and when the logarithmic viscosity is 2.0 dL/g or less, molding processability and handleability are good. The logarithmic viscosity μ is obtained according to the following expression by measuring the elapsed times for flowing concentrated sulfuric acid and the polyimide resin solution at 30° C. with a Cannon-Fenske viscometer.

$\mu = \ln(ts/t_0)/C$ $t_0$: elapsed time for flowing concentrated sulfuric acid
ts: elapsed time for flowing polyimide resin solution
C: 0.5 (g/dL)

The weight average molecular weight Mw of the polyimide resin (A) is preferably in the range of 10,000 to 150,000, more preferably 15,000 to 100,000, further preferably 20,000 to 80,000, still further preferably 30,000 to 70,000, and still further preferably 35,000 to 65,000. When the weight average molecular weight Mw of the polyimide resin (A) is 10,000 or more, the mechanical strength is good, and when it is 150,000 or less, the molding processability is good.

The weight average molecular weight Mw of the polyimide resin (A) can be measured by a gel permeation chromatography (GPC) method using polymethyl methacrylate (PMMA) as a standard sample.

(Method for Producing Polyimide Resin (A))

The polyimide resin (A) may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxy groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A cliamine containing an alicyclic hydrocarbon structure generally has conformational isomers, and the ratio of the cis isomer and the trans isomer is not particularly limited.

The chain aliphatic cliamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic cliamine having from 8 to 10 carbon atoms can be preferably used, and at least one selected from the group consisting of 1,8-octamethylenediamine and 1,10-decamethylenediamine can be particularly preferably used.

In the production of the polyimide resin (A), the molar ratio of the charged amount of the diamine containing at least one alicyclic hydrocarbon structure with respect to the total amount of the diamine containing at least one alicyclic hydrocarbon structure and the chain aliphatic diamine is preferably 20 to 70 mol %. The molar ratio is preferably 25 mol % or more, more preferably 30 mol % or more, further preferably 32 mol % or more, and is preferably 60 mol % or less, more preferably 50 mol % or less, further preferably less than 40 mol, and further preferably 35 mol % or less from the viewpoint of exerting high crystallinity.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the cliamine containing at least one alicyclic hydrocarbon structure and the chain aliphatic cliamine is preferably 25 mol % or less. The lower limit thereof is not particularly limited but needs to exceed 0 mol %.

The molar ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

In addition, the molar ratio is preferably 12 mol % or less, more preferably 10 mol % or less, further preferably 5 mol % or less and still more preferably 0 mol % from the viewpoint of a decrease in coloration of the polyimide resin.

In the production of the polyimide resin (A), the charged amount ratio of the tetracarboxylic acid component and the diamine component is preferably from 0.9 to 1.1 mol of the diamine component per 1 mol of the tetracarboxylic acid component.

In the production of the polyimide resin (A), an end capping agent may be mixed in addition to the tetracarboxylic acid component and the diamine component. The end capping agent is preferably at least one selected from the group consisting of a monoamine compound and a dicarboxylic acid compound. The amount of the end capping agent to be used may be any amount as long as a desired amount of an end group can be introduced into the polyimide resin (A), and the amount is preferably 0.0001 to 0.1 mol, more preferably 0.001 to 0.06 mol, and further preferably 0.002 to 0.035 mol, per 1 mol of the tetracarboxylic acid and/or the derivative thereof.

Among them, monoamine end capping agents are preferable as the end capping agent, and from the viewpoint of introducing the above-described chain aliphatic group having 5 to 14 carbon atoms at an end of the polyimide resin (A) to improve heat aging resistance, a monoamine that has a chain aliphatic group having 5 to 14 carbon atoms is more preferable, and a monoamine that has a saturated linear aliphatic group having 5 to 14 carbon atoms is further preferable.

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the polyimide resin (A), a known polymerization method may be applied, and the method described in WO 2016/147996 can be used.

<Fluororesin (B)>

The polyimide resin composition of the present invention contains the polyimide resin (A) and a fluororesin (B) having a weight loss percentage measured using a differential scanning calorimeter after heating from 100° C. to 450° C. at a heating rate of 10° C./min in an air atmosphere of 1% or less. By adding the particular fluororesin (B) to the above-described polyimide resin (A) having a particular structure, a molded article comprising the resulting polyimide resin composition has high slidability and good appearance. For a polyimide resin composition using, instead of the component (B), a fluororesin having a weight loss percentage measured using a differential scanning calorimeter after heating from 100° C. to 450° C. at a heating rate of 10° C./min in an air atmosphere of more than 1% (hereinafter also referred to as "weight loss percentage after heating at 450° C. under an air atmosphere", or simply "weight loss percentage"), the slidability of the obtained molded article is lowered, and the appearance of the molded article also deteriorates, for example, the surface roughness and the peeling of the molded article surface layer occur.

Although the reason for this is not certain, it is believed that because that fluororesins having a low weight loss percentage in an air atmosphere have excellent heat resistance and exhibit little thermal degradation during melt-kneading with the component (A) and the series of molding processes, the obtained molded article can stably exhibit high slidability, and the molded article appearance is also better. From the viewpoint of subjecting the polyimide resin composition to thermoforming in an air atmosphere, as a characteristic of the component (B), rather than the weight loss percentage in an inert gas atmosphere such as nitrogen, it is important that the weight loss percentage in an air atmosphere is 1% or less.

From the viewpoint of obtaining a molded article having high slidability and good appearance, the weight loss percentage is 1% or less, preferably 0.8% or less, more preferably 0.5% or less, and further preferably 0.3% or less.

The weight loss percentage can be calculated using a differential scanning calorimeter from the difference in a sample weight at temperatures of 100° C. and 450° C. when a sample (fluororesin) is heated to about 450° C. at a heating rate of 10° C./min in an air atmosphere. Specifically, the weight loss percentage can be measured by the method described in the examples.

As used herein, fluororesins for which the weight after heating at 450° C. under an air atmosphere does not change or increases are also included in the range of "a weight loss percentage of 1% or less". Further, for fluororesins having a weight increase after heating at 450° C. under an air atmosphere, the weight loss percentage is indicated as a negative value.

The melting point Tm of the component (B) is preferably 325° C. or more, more preferably 328° C. or more, and further preferably 329° C. or more. When the melting point Tm of the component (B) is 325° C. or more and more preferably 328° C. or more, it is advantageous from the viewpoint of obtaining a molded article having high slidability and good appearance. The upper limit of the melting point Tm of the component (B) is not particularly limited, but is usually 360° C. or less.

The component (B) has a difference between the melting point Tm and the crystallization temperature Tc, Tm−Tc, of preferably 19.5° C. or more, more preferably 19.8° C. or more, and further preferably 20.0° C. or more. When Tm−Tc is 19.5° C. or more, a molded article having higher slidability and better appearance is obtained. The upper limit of Tm−Tc is not particularly limited, but is preferably 25.0° C. or less, and more preferably 23.5° C. or less.

Specifically, the melting point and crystallization temperature of the component (B) can be measured by the methods described in the examples.

Examples of the fluororesin used for the component (B) include polytetrafluoroethylene (PTFE), polychlorotrifluoroethylene (PCTFE), polyvinylidene fluoride (PVDF), a copolymer of tetrafluoroethylene and hexafluoropropylene (FEP), a copolymer of tetrafluoroethylene and perfluoroalkyl vinyl ether (PFA), a copolymer of tetrafluoroethylene and ethylene (ETFE), a copolymer of tetrafluoroethylene and perfluoroalkoxyethylene, and the like. One or more of these can be used. Among these, polytetrafluoroethylene is preferable from the viewpoint of obtaining a molded article having high heat resistance, high slidability, and good appearance.

From the viewpoint of obtaining a molded article having high slidability and good appearance, and from the viewpoint of handleability, it is preferable that the component (B) is powdery. The average particle size (D50) of the fluororesin powder is not particularly limited, but from the viewpoint of obtaining a molded article having high slidability and good appearance, and from the viewpoint of handleability, it is preferably 1 µm or more, more preferably 2 µm or more, further preferably 3 µm or more, and still further preferably 5 µm or more. Further, from the viewpoint of dispersibility in the polyimide resin (A), the average particle size (D50) of the fluororesin powder is preferably 50 µm or less, more preferably 40 µm or less, further preferably 30 µm or less, and still further preferably 20 µm or less.

The average particle size (D50) can be measured by a laser diffraction light scattering particle size distribution measuring instrument.

The content of the component (B) in the polyimide resin composition of the present invention is, from the viewpoint of imparting high slidability, preferably 2% by mass or more, more preferably 5% by mass or more, and further preferably 10% by mass or more. When the polyimide resin composition of the present invention does not contain any of the carbon fiber and graphite described later, the content of the component (B) is, from the viewpoint of imparting high slidability, more preferably 15% by mass or more, further preferably 20% by mass or more, and still further preferably 25% by mass or more.

Further, from the viewpoint of maintaining good appearance and mechanical strength while imparting high slidability, the content of the component (B) in the polyimide resin composition of the present invention is preferably 50% by mass or less, more preferably 40% by mass or less, and further preferably 35% by mass or less.

As the component (B), a commercially available fluororesin can be used. Among commercially available fluororesins, examples of polytetrafluoroethylene include "KT-600M" (weight loss percentage: −0.68% (weight gain)) and "KTL-610A" (weight loss percentage: 0.63%) manufactured by Kitamura Ltd., and "Polyflon PTFE Ruburon" series manufactured by Daikin Industries, Ltd.

The polyimide resin composition of the present invention can further contain at least one selected from the group consisting of carbon fiber and graphite for the purpose of improving various properties, such as slidability, mechanical strength, and flame resistance.

<Carbon Fiber>

Carbon fiber is used for the purpose of improving the mechanical strength, flame resistance, and the like of the obtained molded article. Examples of the carbon fiber include polyacrylonitrile-based carbon fiber and pitch-based carbon fiber.

There is no particular limitation in the form of the carbon fiber, and depending on the form of the polyimide resin composition and molded article to be obtained, any one of continuous fibers and short fibers can be used, or both may be used in combination.

The form of the polyimide resin composition will be described later, but for example, when the polyimide resin composition is in pellet form, from the viewpoint of extrusion moldability and the like, the carbon fiber is preferably short fibers having an average fiber length of less than 10 mm. The polyimide resin composition may be in the form of a prepreg in which a mixture containing the polyimide resin (A) and a fluororesin as the component (B) is impregnated with carbon fiber, and in this case the carbon fiber is preferably continuous fibers.

If the carbon fiber is short fibers, the average fiber length is preferably less than 10 mm, more preferably 0.5 mm to 8 mm, and further preferably 2 to 8 mm.

If the carbon fiber is continuous fibers, examples thereof include various forms of carbon fiber in which monofilaments or multifilaments are simply arranged in one direction or alternately, fabrics such as woven fabrics, non-woven fabrics, mats, and the like. Among these, carbon fiber in the form of monofilaments, fabric, non-woven fabric, or a mat is preferable, and in the form of fabric is more preferable.

If the carbon fiber is continuous fibers, the fineness of the fibers is preferably 20 to 4,500 tex, and more preferably 50 to 4,000 tex. When the fineness is in this range, impregnation of the polyimide resin (A) is easy, and the elastic modulus and strength of the obtained molded article are excellent. The fineness can be calculated by determining the weight of a continuous fiber of any length and converting into a weight per 1,000 m.

The average fiber diameter of the carbon fiber is preferably 1 to 100 µm, more preferably 3 to 50 µm, and further preferably 4 to 20 µm. When the average fiber diameter is in this range, processing is easy, and the elastic modulus and strength of the obtained molded article are excellent.

The average fiber length of the carbon fiber (short fibers) and the average fiber diameter of the carbon fiber are obtained by randomly selecting and observing 50 or more fibers with a scanning electron microscope (SEM) or the like, measuring, and calculating the number average.

The number of filaments of the carbon fiber is usually in the range of 500 to 100,000, preferably 5,000 to 80,000, more preferably 10,000 to 70,000.

In order to improve the wettability and interface adherence with the polyimide resin (A), it is preferable that the carbon fiber is surface treated with a surface treatment agent. The surface treatment agent is a concept that includes a bundling agent and a sizing agent.

Examples of the surface treatment agent include epoxy-based materials, urethane-based materials, acrylic materials, polyamide-based materials, polyester-based materials, vinyl ester-based materials, polyolefin-based materials, polyether-based materials, and the like. One or more of these can be used in combination. From the viewpoint of obtaining higher mechanical properties, an epoxy-based material is preferable as the surface treatment agent.

The treatment amount of the carbon fiber with the surface treatment agent can be appropriately selected according to the type of surface treatment agent, the form of the carbon fiber, and the like. For example, when short fibers are used as the carbon fiber, from the viewpoint of improving clispersibility to the polyimide resin (A), it is preferable to surface treat with a sizing agent, and the adhesion amount of the sizing agent is preferably in the range of 1.5 to 10% by mass, and more preferably 2 to 5% by mass.

Commercially available products can also be used as the carbon fiber. Examples of commercially available carbon fiber (short fibers) include the chopped fibers "CFUW", "CFEPP", "CFEPU", "CFA4", "FX1", "EX1", "BF-WS", and "CF-N" series manufactured by Nihon Polymer Sangyo Co., Ltd., and the "Pyrofil Chopped Fiber" series manufactured by Mitsubishi Chemical Corporation.

When the polyimide resin composition of the present invention contains carbon fiber, the content thereof in the polyimide resin composition is preferably 1 to 30% by mass, more preferably 2 to 20% by mass, and further preferably 5 to 15% by mass. If the content of the carbon fiber in the polyimide resin composition is 1% by mass or more, an effect of improving mechanical strength can be obtained, and if the content is 30% by mass or less, an increase in the specific abrasion loss can be suppressed and a good appearance tends to be maintained.

<Graphite>

Graphite is used for the purpose of improving the limit PV value, mechanical strength, flame resistance, and the like of the obtained molded article. The graphite may be either natural graphite or artificial graphite. Examples of the graphite include natural graphite such as flake graphite, vein graphite (also called lump graphite), amorphous graphite, and spherical graphite, expandable graphite obtained by chemically treating flake graphite with concentrated sulfuric acid or the like and then heating, expanded graphite obtained by heating expandable graphite at high temperature, and artificial graphite.

Among the above, natural graphite is preferable as the graphite used in the present invention, and one or more selected from the group consisting of flake graphite and vein graphite are more preferable.

The average particle size (D50) of the graphite is not particularly limited, but from the viewpoint of improving the limit PV value and the mechanical strength of the obtained molded article, from the viewpoint of obtaining high flame resistance, and from the viewpoint of handleability, it is preferably more than 1 μm, more preferably 2 μm or more, further preferably 3 μm or more, and still further preferably 5 μm or more. Further, from the viewpoint of dispersibility in the polyimide resin (A), the average particle size (D50) of the graphite is preferably 50 μm or less, more preferably 40 μm or less, further preferably 30 μm or less, and still further preferably 20 μm or less.

The average particle size (D50) can be measured by a laser diffraction light scattering particle size distribution measuring instrument.

The graphite may be surface treated with a silane coupling agent, a titanate coupling agent, an aluminate coupling agent, or the like to the extent that the effects of the present invention are not impaired.

Commercially available products can also be used for the graphite. Examples of commercially available graphite include the flake graphite "BF-3AK", "BF-15AK", "FBF", "CBR", "CPB-6S", "CPB-3", "96L", "96L-3", and "K-3", vein graphite "BF-10AK", "HLP", and spherical graphite "WF-15C", all manufactured by Chuetsu Graphite Works Co., Ltd., and the vein graphite powders CP series, CB series, and F #series, amorphous graphite powders "Blue P", "AP", and "P #1", artificial graphite powders PAG series and HAG series, spherical graphite powders CGC series and CGB series, flake graphite powders "GR-15", "CMX-40" "UP-20", "UP-35N", "UP-15N", and "UP-5N", as well as ACP series, ACB series, SP series, and the like, all manufactured by Nippon Graphite Industries Ltd.

When the polyimide resin composition of the present invention contains graphite, the content thereof in the polyimide resin composition is preferably 1 to 30% by mass, more preferably 2 to 20% by mass, and further preferably 5 to 15% by mass. If the content of graphite in the polyimide resin composition is 1% by mass or more, effects of improving the limit PV value and mechanical strength can be obtained, and if the content is 30% by mass or less, a good appearance tends to be maintained.

From the viewpoint of improving the limit PV value of the obtained molded article, the polyimide resin composition of the present invention preferably contains both carbon fiber and graphite.

In this case, the total content of carbon fiber and graphite in the polyimide resin composition is preferably 2 to 40% by mass, more preferably 5 to 30% by mass, and further preferably 10 to 25% by mass. If the total content of carbon fiber and graphite in the polyimide resin composition is 2% by mass or more, effects of improving the limit PV value and mechanical strength can be obtained, and if the content is 40% by mass or less, an increase in the specific abrasion loss can be suppressed and a good appearance tends to be maintained.

Further, the proportion of carbon fiber based on the total content of carbon fiber and graphite is preferably 99% by mass or less, more preferably 95% by mass or less, further preferably 90% by mass or less, still further preferably 80% by mass or less, even still further preferably 70% by mass or less, and still even more preferably 60% by mass or less. In the above range, the limit PV value of the obtained molded article is good, and an increase in the specific abrasion loss can be suppressed.

<Additive>

In the polyimide resin composition of the present invention, additives other than may be mixed as required, such as a filler other than the above-described carbon fiber and graphite, a delusterant, a nucleating agent, a plasticizer, an antistatic agent, an anti-coloring agent, an anti-gelling agent, a colorant, a conducting agent, a flame retardant, and a resin-modifying agent.

The amount of the above additive mixed is not particularly limited, and usually 50 mass % or less, preferably 0.0001 to 30 mass %, more preferably 0.001 to 15 mass %, and further preferably 0.01 to 10 mass % in the polyimide resin composition from the viewpoint that the physical properties derived from the polyimide resin (A) are maintained and the effect of the additive is exerted.

Another resin other than the polyimide resin (A) may also be mixed in the polyimide resin composition of the present invention, without impairing the characteristics of the composition. Such another resin is preferably a high heat resistant thermoplastic resin, and examples thereof include a polyamide resin, a polyester resin, a polyimide resin other than the polyimide resin (A), a polycarbonate resin, a polyetherimide resin, a polyamideimide resin, a polyphenylene ether imide resin, a polyphenylene sulfide resin, a polysulfone resin, a polyethersulfone resin, a polyallylate resin, a liquid crystal polymer, a polyether ether ketone resin, a polyether ketone resin, a polyether ketone ketone resin, a polyether ether ketone ketone resin, and a polybenzoimidazole resin. Among these, one or more selected from the group consisting of a polyether imide resin, a polyphenylene sulfide resin, and a polyether ether ketone resin are preferable from the viewpoint of heat resistance, molding processability, strength and solvent resistance.

When the polyimide resin (A) is used in combination with another resin, the rate of such another resin to be mixed is not particularly limited, without impairing the characteristics of the polyimide resin composition.

However, the total content of the polyimide resin (A) and the fluororesin (B) in the polyimide resin composition of the present invention is preferably 50% by mass or more, more preferably 60% by mass or more, and further preferably 70% by mass or more, from the viewpoint of obtaining the effects of the present invention. The upper limit is 100% by mass.

Although the polyimide resin composition of the present invention can take any form, it is preferably a pellet.

Since the polyimide resin composition of the present invention and the polyimide resin (A) used for the composition have thermoplasticity, for example, the polyimide resin (A), the fluororesin (B), and various optional components as necessary are melt-kneaded in an extruder to extrude a strand, which strand can then be cut into pellets.

When carbon fiber is used, all of the components other than the carbon fiber can be dry blended, then melt-kneaded in an extruder and pelletized. The carbon fiber is side-fed into the extruder while re-introducing the pellets, and the mixture is melt-kneaded in the extruder to extrude a strand, which can be pelletized. Alternatively, all of the components other than the carbon fiber can be dry blended, then fed into an extruder from a hopper, the carbon fiber is side-fed, and the mixture is melt-kneaded in the extruder to extrude a strand, which can be pelletized.

A molded article having a desired shape can be easily produced by introducing the obtained pellets into various molding machines and thermoforming by the method described later.

<Slidability>

The polyimide resin composition of the present invention has high slidability. Specifically, the molded article comprising the polyimide resin composition of the present invention can have a limit PV value measured in a 23° C., 50% R.H. environment under conditions of a sliding speed of 0.5 m/s, an initial load of 50 N, and a load step of 30 N/10 minutes in accordance with the JIS K7218 (1986)-A method, of preferably 1.0 MPa·m/s or more, more preferably 1.2 MPa·m/s or more, and further preferably 1.5 MPa·m/s or more.

Specifically, the limit PV value can be measured by the method described in the examples.

Further, the molded article comprising the polyimide resin composition of the present invention can have a specific abrasion loss measured in a 23° C., 50% R.H. environment under conditions of a sliding speed of 0.5 m/s, an initial load of 50 N, and a sliding distance of 3 km in accordance with the JIS K7218 (1986)—A method, of preferably 200 ($10^{-9}$ cm$^3$/kgf·m) or less, more preferably 192 ($10^{-9}$ cm$^3$/kgf·m) or less, further preferably 150 ($10^{-9}$ cm$^3$/kgf·m) or less, still further preferably 100 ($10^{-9}$ cm$^3$/kgf·m) or less, even still further preferably 80 ($10^{-9}$ cm$^3$/kgf·m) or less, and still even more preferably 50 ($10^{-9}$ cm$^3$/kgf·m) or less.

Specifically, the specific abrasion loss can be measured by the method described in the examples.

Two types of factors representing slidability are generally referred to as friction and abrasion, and the importance of each of those factors varies depending on the application. For example, when the molded article is applied in a speaker diaphragm or a film for such a diaphragm, the friction characteristics affecting slipperiness, electrostatic characteristics (charging properties) due to vibration, and the like are more important than abrasion characteristics. The friction characteristics can be evaluated by measuring a static friction coefficient, a dynamic friction coefficient, or the like.

On the other hand, in a sliding member such as a shaft bearing, a gear, a bush, a mechanical seal, and a transmission seal, abrasion characteristics are more important because a remarkable abrasion loss occurs during usage. The abrasion characteristics can be evaluated by measuring the above-described limit PV value, specific abrasion loss, and the like.

In addition, since the polyimide resin composition of the present invention exhibits low dielectric properties, it is expected that the polyimide resin composition and molded article thereof can also be applied in various applications where a low dielectric constant is required.

[Molded Article]

The present invention provides a molded article including the polyimide resin composition.

Since the polyimide resin composition of the present invention has thermoplasticity, the molded article of the present invention can be easily produced by heat-molding. Examples of the heat molding method include injection molding, extrusion molding, blow molding, heat press molding, vacuum molding, pneumatic molding, laser molding, welding, and heat adhesion, and the polyimide resin composition of the present invention may be molded by any molding method that includes a heat melting step. For example, in injection molding, the polyimide resin composition of the present invention is preferable because molding can be carried out at a molding temperature of 360° C. or less and a mold temperature of 220° C. or less, and so molding can be carried out at a relatively low temperature.

The method for producing a molded article preferably includes the step of heat-molding the polyimide resin composition at from 290 to 350° C. Examples of the specific procedure include the following methods.

First, the polyimide resin (A) is dry blended with the fluororesin (B) and various optional components as necessary, then introduced into an extruder, melted at preferably 290 to 350° C., and melt-kneaded in the extruder and extruded to produce pellets. Alternatively, the polyimide resin (A) may be introduced into the extruder, melted at preferably 290 to 350° C., the fluororesin (B) and various optional components introduced thereto and melt-kneaded with the polyimide resin (A) in the extruder, and extruded to produce the pellets.

When carbon fiber is used, as described above, it is preferable to introduce the carbon fiber by side feeding into the extruder.

The pellets may be dried, then introduced in various kinds of molding machines, and heat-molded preferably at from 290 to 350° C., thereby producing a molded article having a desired shape.

Since the polyimide resin composition of the present invention may be heat-molded by extrusion molding or the like at a relatively low temperature of from 290 to 350° C., the polyimide resin composition is excellent in molding processability and may be easily produced into a molded product having a desired shape. The temperature of the heat molding is preferably from 310 to 350° C.

The molded article of the present invention has excellent slidability, and in particular is suitably used for various shaft bearings such as shaft bearings for automobiles and shaft bearings for copiers, gears, bearings, bushes, mechanical seals, transmission seals, and the like. Further, the molded article of the present invention is expected to be applied in applications where a low dielectric constant is required, for example, in fifth-generation (5G) mobile communication system related members, portable electronic device communication members such as smartphones, members for antennas, members for millimeter-wave radar, and the like.

EXAMPLES

The present invention will be described in more detail with reference to examples below, but the present invention is not limited thereto. Further, various measurements and evaluations in each Production Example and Example were carried out in the following manner.

<Infrared Spectroscopy (IR Measurement)>

The IR measurement of the polyimide resin was performed with "JIR-WINSPEC 50", produced by JEOL, Ltd.

<Logarithmic Viscosity μ>

The polyimide resin was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity μ was obtained according to the following expression.

$\mu = \ln(ts/to)/C$ $t_0$: elapsed time for flowing concentrated sulfuric acid
ts: elapsed time for flowing polyimide resin solution
C: 0.5 g/dL <Melting point, glass transition temperature, crystallization temperature, and exothermic amount of crystallization>

The melting point Tm and ΔTm, the glass transition temperature Tg, the crystallization temperature Tc, and the exothermic amount of crystallization ΔHm were measured with a differential scanning calorimeter ("DSC-6220", produced by SII Nanotechnology, Inc.).

The samples were subjected to the following thermal history in a nitrogen atmosphere. The condition of the thermal history included the first heating (heating rate: 10° C./min), then cooling (cooling rate: 20° C./min), and then second heating (heating rate: 10° C./min). The heating temperature was from room temperature to 400° C.

The melting point Tm was determined by reading the peak top value of the endothermic peak observed in the second heating. ΔTm (mJ/mg) was calculated from the area of the endothermic peak observed in the second heating. The glass transition temperature (Tg) was determined by reading the value observed in the second heating. The crystallization temperature (Tc) was determined by reading the peak top value of the exothermic peak observed in cooling.

The exothermic amount of crystallization ΔHm (mJ/mg) was calculated from the area of the exothermic peak observed in cooling.

<Crystallization Half-time>

The crystallization half-time of the polyimide resin was measured with a differential scanning calorimeter ("DSC-6220", produced by SII Nanotechnology, Inc.).

The polyimide resin was held at 420° C. for 10 minutes in a nitrogen atmosphere so as to completely melt, then quenched at a cooling rate of 70° C./min, and the time required from the appearance of the observed crystallization peak to the peak top thereof was calculated. In Table 1, cases where the crystallization half-time was 20 seconds or less are indicated as "<20".

<Weight Average Molecular Weight>

The weight average molecular weight (Mw) of the polyimide resin was measured with a gel permeation chromatography (GPC) measurement apparatus "Shodex GPC-101" produced by Showa Denko K.K. under the following conditions:

Column: Shodex HFIP-806M
  Mobile phase solvent: HFIP containing 2 mM sodium trifluoroacetate
  Column temperature: 40° C.
  Flow rate of mobile phase: 1.0 mL/min
  Specimen concentration: about 0.1 mass %
  Detector: IR detector
  Amount of injection: 100 μm
  Calibration curve: standard PMMA <Weight Loss Percentage>

The weight loss percentage of the fluororesin was calculated using a differential scanning calorimeter ("DSC-6220", produced by SII Nanotechnology, Inc.) from the difference in a sample weight at temperatures of 100° C. and 450° C. when about 10 mg of the sample was heated to about 450° C. at a heating rate of 10° C./min in an air atmosphere having a flow rate of 250 mL/min. The results are shown in Table 2. In Table 2, for fluororesins in which the weight after heating at 450° C. under an air atmosphere increased, the value of weight loss percentage is expressed as a negative value.

<Bending Strength and Flexural Modulus>

The polyimide resin composition produced in each of the Examples was used to prepare by the method described later a molded article of 80 mm×10 mm×4 mm in thickness prescribed in ISO 316, which was used for measurement. The bending test was performed with Bend Graph (produced by Toyo Seiki Seisaku-Sho, Ltd.) according to ISO 178 at a temperature of 23° C. and a testing speed of 2 mm/min to measure the bending strength and the flexural modulus.

<Specific Dielectric Constant (εr) and Dielectric Loss Tangent (tanδ)>

Using the polyimide resin composition of Example 4 and Comparative Example 1, molded articles were produced by injection molding by the method described later. The produced molded articles were then cut to obtain test pieces 1.5 mm×80 mm×1.5 mm in thickness. The test pieces were dried with a desiccator and then promptly used for measurement. As the measuring device, a "PNA-L network analyzer N5230A" manufactured by Agilent Technologies, Inc. and a cavity resonator "CP531" manufactured by Kanto Electronics Co., Ltd., were used. The specific dielectric constant (εr) and dielectric loss tangent (tanδ) were measured in accordance with IEC 62810 by a cavity perturbation technique at a temperature of 23° C., a humidity of 50%, and a measurement frequency of 10 GHz. The measured value was the average value of n=2.

<Limit PV Value>

Using the polyimide resin composition produced in each of the Examples, a flat molded article of 70 mm×70 mm×3 mm in thickness was prepared by the method described later, and then cut to obtain test pieces of 30 mm×30 mm×3 mm in thickness. Using these test pieces, the limit PV value (MPa·m/s) was measured under the following conditions in accordance with the JIS K7218 (1986)-A method.

(Test Conditions)
Measuring equipment: Model EMF-III-F friction abrasion tester manufactured by A&D Company, Limited.
Laboratory environment: 23° C.; 50% R.H.
Opposite material: S45C ring (surface roughness of about 0.8 μm Ra, contact area of 2 cm$^2$)
Sliding speed: 0.5 m/s
Initial load: 50 N
Load step: 30 N/10 min
Number of measurements: n=1

<Specific Abrasion Loss>

Using the polyimide resin composition produced in each of the Examples, a flat molded article of 70 mm×70 mm×3 mm in thickness was prepared by the method described later, and then machine processed to obtain test pieces of 30 mm×30 mm×3 mm in thickness. Using these test pieces, the specific abrasion loss ($10^{-9}$ cm$^3$/kgf·m) was measured under the following conditions in accordance with the JIS K7218 (1986)-A method.

(Test Conditions)
Measuring equipment: Model EMF-III-F friction abrasion tester manufactured by A&D Company, Limited.
Laboratory environment: 23° C.; 50% R.H.
Opposite material: S45C ring (surface roughness of about 0.8 μm Ra, contact area of 2 cm$^2$)
Sample speed: 0.5 m/s
Load: 50 N
Test time: 100 min (sliding distance of 3 km)
Number of measurements: n=1
<Appearance Evaluation>

Using the polyimide resin composition produced in each of the Examples, a flat molded article of 70 mm×70 mm×3 mm in thickness was produced by the method described later. The cut surface of the gate portion at the time of injection molding of the molded article and the molded article surface were visually observed, and their appearance was evaluated according to the following criteria.

AA: There is no peeling of the surface layer on the cutting surface, and no granular matter is observed on the molded article surface A: There is no peeling of the surface layer on the cutting surface, but fine granular matter is observed on the molded article surface.

B: There is no peeling of the surface layer on the cutting surface, but surface roughness of the molded article is observed.

C: There is peeling of the surface layer on the cutting surface, and surface roughness of the molded article is also observed.

Production Example 1 (Production of polyimide resin 1)

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl)cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy)ethanol with a 500 mL beaker, thereby preparing a mixed diamine solution. This mixed diamine solution was added into the suspended solution gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.284 g (0.010 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 180° C. for 10 hours with a drier, thereby providing 317 g of a powder of polyimide resin 1.

The measurement of the IR spectrum of polyimide resin 1 showed the characteristic absorption of an imide ring v(C=O) observed at 1768 and 1697 (cm$^{-1}$). The logarithmic viscosity was 1.30 dL/g, Tm was 323° C., Tg was 184° C., Tc was 266° C., the exothermic amount of crystallization was 21.0 mJ/mg, the crystallization half-time was 20 seconds or less, and Mw was 55,000.

Table 1 shows the composition and evaluation results of the polyimide resin of Production Example 1, and Table 2 shows the measurement results of the weight loss percentage of the fluororesin used in this embodiment. The values expressed in mol % of the tetracarboxylic acid component and the diamine component in Table 1 are values calculated from the charged amount of each component in production of the polyimide resin.

TABLE 1

| | | Tetracarboxylic acid component (mol % in the total tetracarboxylic acid component) | Diamine component (mol % in the total diamine component) | | (1)/ {(1) + (2)} (mol %) | Tm (° C.) | Tg (° C.) | Tc (° C.) | Exothermic amount of crystallization ΔHm (mJ/mg) | Crystallization half-time (second) | Mw |
|---|---|---|---|---|---|---|---|---|---|---|---|
| | | PMDA | 1,3-BAC | OMDA | *1 | | | | | | |
| Production Example 1 | Polyimide resin 1 | 100 | 35 | 65 | 35 | 323 | 184 | 266 | 21.0 | <20 | 55,000 |

*1 Content ratio (mol %) of the repeating structural unit of the formula (1) with respect to the total of the repeating structural unit of the formula (1) and the repeating structural unit of the formula (2) in Polyimide resin 1

The abbreviations in the table are as follows.
PMDA; pyromellitic dianhydride
1,3-BAC; 1,3-bis(aminomethyl)cyclohexane
OMDA; 1,8-octamethylenediamine

TABLE 2

| | Tm (° C.) | ΔTm mJ/mg | Tc (° C.) | ΔHm mJ/mg | Tm − Tc (° C.) | Weight loss percentage % |
|---|---|---|---|---|---|---|
| (B1) Fluororesin 1 (KTL-610A) | 331.0 | 59.4 | 309.8 | 59.3 | 21.2 | 0.63 |
| (B2) Fluororesin 2 (KT-600M) | 329.7 | 38.3 | 309.3 | 40.3 | 20.4 | −0.68 |

TABLE 2-continued

|  | Tm (° C.) | ΔTm mJ/mg | Tc (° C.) | ΔHm mJ/mg | Tm − Tc (° C.) | Weight loss percentage % |
|---|---|---|---|---|---|---|
| (b1) Comparison Fluororesin 1 (KTL-610) | 328.4 | 61.1 | 309.6 | 60.2 | 18.8 | 1.53 |

Examples 1 to 6 and Comparative Examples 1 and 2 (Production and Evaluation of Polyimide Resin Compositions)

Polyimide resin 1 obtained in Production Example 1 and the components other than carbon fiber among the various components shown in Table 3 were thoroughly mixed by dry blending. The resulting mixed powder was extruded at a barrel temperature of 350° C. and a screw rotation speed of 70 rpm with Labo Plasto Mill (produced by Toyo Seiki Seisaku-Sho, Ltd.). A strand extruded from the extruder was cooled in air and then pelletized with a pelletizer ("Fan Cutter FC-Mini-4/N", produced by Hoshi Plastic Co., Ltd.).

The obtained pellets were dried at 190° C. for 10 hours and then used in injection molding.

The injection molding was performed at a barrel temperature of 350° C. and a mold temperature of 200° C., and a molding cycle of 50 seconds with an injection molding machine ("ROBOSHOT α-S30iA", produced by FANUC Corporation), thereby preparing a molded article having a desired shape to be used in the various evaluations.

The various evaluations described above were performed using the obtained pellets or molded article. The results are shown in Table 3.

TABLE 3

|  |  |  | Example |  |  |  |  |  | Comparative Example |  |
|---|---|---|---|---|---|---|---|---|---|---|
|  |  |  | 1 | 2 | 3 | 4 | 5 | 6 | 1 | 2 |
| Blend (% by mass) | (A) Polyimide resin 1 |  | 89 | 89 | 79 | 69 | 79.1 | 69.2 | 100 | 89 |
|  | (B1) Fluororesin 1 (KTL-610A) |  | 10 |  |  |  |  |  |  |  |
|  | (B2) Fluororesin 2 (KT-600M) |  |  | 10 | 20 | 30 | 10 | 10 |  |  |
|  | (b1) Comparison Fluororesin 1 (KTL-610) |  |  |  |  |  |  |  |  | 10 |
|  | Carbon fiber |  |  |  |  |  | 10 | 10 |  |  |
|  | Graphite |  |  |  |  |  |  | 10 |  |  |
|  | Talc |  | 1 | 1 | 1 | 1 | 0.9 | 0.8 |  | 1 |
|  | Total |  | 100 | 100 | 100 | 100 | 100 | 100 | 100 | 100 |
| Evaluation results | Melting point (Tm) | ° C. | 314,322,329 | 314,321,328 | 314,322,328 | 314,328 | 314,322,329 | 314,322,328 | 323 | 314,326 |
|  | Glass transition temperature (Tg) | ° C. | 187 | 187 | 189 | 191 | — | 187 | 185 | 188 |
|  | Crystallization temperature (Tc) | ° C. | 288,313,241 | 311,288,242 | 311,289,243 | 310,288,241 | 242,289,310 | 240,296,312 | 270,234 | 289,241 |
|  | Exothermic amount of crystallization (ΔHm) | mJ/mg | 24.0 | 23.1 | 24.2 | 26.8 | 21.0 | 19.0 | 20.3 | 24.0 |
|  | Bending strength | MPa | 109.6 | 110.0 | 99.6 | 88.2 | 194.0 | 163.1 | 120.0 | 111.7 |
|  | Flexural modulus | GPa | 2.5 | 2.6 | 2.5 | 2.4 | 7.8 | 11.2 | 2.6 | 2.7 |
|  | Specific dielectric constant (εr) | 10 GHz | — | — | — | — | 2.52 | — | — | 2.68 | — |
|  | Dielectric loss tangent (tanδ) | 10 GHz | — | — | — | — | 0.00224 | — | — | 0.00390 | — |
|  | Limit PV value | 0.5 m/s, 23° C. | MPa · m/s | 1.85 | 1.70 | 1.70 | 1.60 | 1.25 | 2.15 | 0.43 | 0.88 |
|  | Specific abrasion loss | 0.5 m/s, 50 N, 100 min 23° C. | 10⁻⁹ cm³/ kgf · m | 99 | 64 | 34 | 42 | 192 | 164 | 767 | 195 |
|  | Appearance evaluation | Visual evaluation | — | A | A | A | A | A | A | AA | C |

* "—" indicates not measured

Regarding the resin compositions of Examples 5 and 6, the obtained pellets were fed into a Labo Plasto Mill (manufactured by Toyo Seiki Seisaku-Sho, Ltd.), carbon fiber in the amount shown in Table 3 was side-fed, and the mixture was extruded at a barrel temperature of 350° C. and a screw rotation speed of 70 rpm to form pellets.

The details of each component shown in Table 3 are as follows.

<Polyimide Resin (A)>

(A) Polyimide resin 1: Polyimide resin 1 obtained in Production Example 1, Mw: 55,000

<Fluororesin>
(B1) Fluororesin 1: "KTL-610A" manufactured by Kitamura Ltd., polytetrafluoroethylene powder, average particle size (D50): 12 μm
(B2) Fluororesin 2: "KT-600M" manufactured by Kitamura Ltd., polytetrafluoroethylene powder, average particle size (D50): 14 μm
(b1) Comparison Fluororesin 1: "KTL-610" manufactured by Kitamura Ltd., polytetrafluoroethylene powder, average particle size (D50): 12 μm
<Carbon Fiber>
"EX1-MC" manufactured by Nihon Sangyo Co., Ltd., sizing agent: epoxy-based, sizing agent amount: 3.0% by mass, average fiber length: 6 mm, average fiber diameter: 7 μm, number of filaments: 12,000
<Graphite>
"BF-10AK" manufactured by Chuetsu Graphite Works Co., Ltd., vein graphite, average particle size (D50): 10 μm
<Talc>
NanoAce D-800 manufactured by Nippon Talc Co., Ltd., average particle size (D50): 0.8 μm As shown in Table 3, the molded articles comprising the polyimide resin compositions of Examples 1 to 6 all had good appearance. Further, it can be seen that slidability is excellent because compared with the molded articles obtained in Comparative Examples 1 and 2, the limit PV value is higher and the specific abrasion loss is smaller.

Further, it can be seen that the molded articles of Examples 5 and 6 containing at least one selected from the group consisting of carbon fiber and graphite have bending strength and a flexural modulus improved compared to the molded articles of Examples 1 to 4, and have high mechanical strength. In particular, the molded article of Example 6 containing carbon fiber and graphite had an improved limit PV value as well as better mechanical strength.

In addition, it can be seen that the molded article of Example 4 has low dielectric properties because the specific dielectric constant and dielectric loss tangent values are lower than for Comparative Example 1.

INDUSTRIAL APPLICABILITY

According to the present invention, a polyimide resin composition that has good molding processability and can produce a molded article having high slidability and good appearance can be provided. The molded article of the present invention has excellent slidability, and in particular is suitably used for various shaft bearings such as shaft bearings for automobiles and shaft bearings for copiers, gears, bearings, bushes, mechanical seals, transmission seals, and the like. Further, the molded article of the present invention is expected to be applied in applications where a low dielectric constant is required, for example, in fifth-generation (5G) mobile communication system related members, portable electronic device communication members such as smartphones, members for antennas, members for millimeter-wave radar, and the like.

The invention claimed is:
1. A polyimide resin composition comprising a polyimide resin (A) and a fluororesin (B), wherein
the polyimide resin (A) comprises a repeating structural unit represented by the following formula (1) and a repeating structural unit represented by the following formula (2),
a content ratio of a number of moles of the repeating structural unit of the formula (1) with respect to a total of a number of moles of the repeating structural unit of the formula (1) and the repeating structural unit of the formula (2) is 0.20 to less than 0.40,
the fluororesin (B) has a weight loss percentage measured using a differential scanning calorimeter after heating from 100° C. to 450° C. at a heating rate of 10° C./min in an air atmosphere of 1% or less:

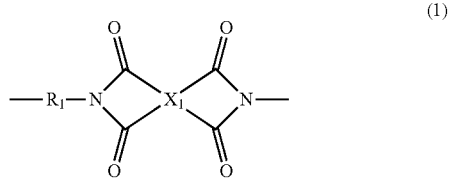

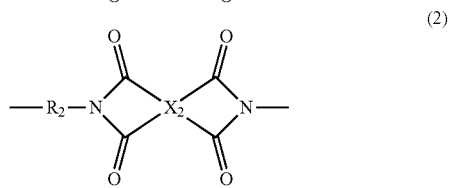

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring,
a content of the fluororesin (B) in the polyimide resin composition is 5 to 50% by mass based on a total mass of polyimide resin composition,
a total content of the polyimide resin (A) and fluororesin (B) in the polyimide resin composition is 50% by mass or more based on a total mass of polyimide resin composition,
the polyimide resin composition further comprises at least one selected from the group consisting of carbon fiber and graphite, and
when the polyimide resin composition comprises the carbon fiber, a content of the carbon fiber in the polyimide resin composition is 1 to 30% by mass based on a total mass of polyimide resin composition, and when the polyimide resin composition comprises the graphite, a content of the graphite in the polyimide resin composition is 1 to 30% by mass based on a total mass of polyimide resin composition.

2. The polyimide resin composition according to claim 1, wherein a difference between a melting point Tm and a crystallization temperature Tc, Tm-Tc, of the fluororesin (B) is 19.5° C. or more.

3. The polyimide resin composition according to claim 1, wherein a proportion of the carbon fiber based on a total content of the carbon fiber and the graphite is 70% by mass or more.

4. The polyimide resin composition according to claim 1, wherein a molded article comprising the polyimide resin composition has a limit PV value measured in a 23° C., 50% R.H. environment under conditions of a sliding speed of 0.5 m/s, an initial load of 50 N, and a load step of 30 N/10 minutes in accordance with the JIS K7218 (1986)-A method, of 1.0 MPa·m/s or more.

5. The polyimide resin composition according to claim 1, wherein a molded article comprising the polyimide resin composition has a specific abrasion loss measured in a 23°

C., 50% R.H. environment under conditions of a sliding speed of 0.5 m/s, an initial load of 50 N, and a sliding distance of 3 km in accordance with the JIS K7218 (1986)-A method, of 200 ($10^{-9}$ cm$^3$/kgf·m) or less.

6. A molded article comprising the polyimide resin composition of claim 1.

7. The polyimide resin composition according to claim 1, wherein the polyimide resin composition comprises both carbon fiber and graphite.

8. The polyimide resin composition according claim 7, wherein a total content of the carbon fiber and the graphite in the polyimide resin composition is 2 to 40% by mass based on a total mass of the polyimide resin.

9. The polyimide resin composition according to claim 1, wherein the polyimide resin composition comprises carbon fiber and a content of the carbon fiber in the polyimide resin composition is 5 to 15% by mass based on a total mass of the polyimide resin.

\* \* \* \* \*